(12) United States Patent
Tueno et al.

(10) Patent No.: US 12,106,227 B2
(45) Date of Patent: Oct. 1, 2024

(54) NON-INTERACTIVE PRIVATE DECISION TREE EVALUATION

(71) Applicant: SAP SE, Walldorf (DE)

(72) Inventors: Anselme Kemgne Tueno, Erlenbach (CH); Yordan Boev, Karlsruhe (DE); Florian Kerschbaum, Waterloo (CA)

(73) Assignee: SAP SE, Walldorf (DE)

( * ) Notice: Subject to any disclaimer, the term of this patent is extended or adjusted under 35 U.S.C. 154(b) by 720 days.

(21) Appl. No.: 16/573,813

(22) Filed: Sep. 17, 2019

(65) Prior Publication Data

US 2021/0081807 A1 Mar. 18, 2021

(51) Int. Cl.
| | |
|---|---|
| *G06N 5/01* | (2023.01) |
| *G06N 20/00* | (2019.01) |
| *H04L 9/00* | (2022.01) |
| *H04L 9/06* | (2006.01) |
| *H04L 9/40* | (2022.01) |

(52) U.S. Cl.
CPC ............... *G06N 5/01* (2023.01); *G06N 20/00* (2019.01); *H04L 9/008* (2013.01); *H04L 9/0656* (2013.01); *H04L 63/0442* (2013.01)

(58) Field of Classification Search
CPC ......... G06N 5/003; G06N 20/00; H04L 9/008
See application file for complete search history.

(56) References Cited

U.S. PATENT DOCUMENTS

| | | | | |
|---|---|---|---|---|
| 7,457,951 B1 * | 11/2008 | Proudler | ............... | G06F 21/567 726/26 |
| 8,489,889 B1 * | 7/2013 | Moscaritolo | .......... | G06F 21/604 708/135 |
| 10,198,399 B1 * | 2/2019 | Fritchman | ............. | G06F 21/602 |
| 10,491,578 B1 * | 11/2019 | Hebert | ...................... | H04L 9/16 |
| 10,873,533 B1 * | 12/2020 | Ismailsheriff | ........... | H04L 47/27 |
| 11,308,222 B2 * | 4/2022 | Taylor | .................... | G06N 3/047 |
| 2004/0243816 A1 * | 12/2004 | Hacigumus | ....... | G06F 16/24561 713/193 |
| 2005/0084110 A1 * | 4/2005 | Palmer | .................. | H04L 9/0662 380/268 |

(Continued)

FOREIGN PATENT DOCUMENTS

WO WO-2016000453 A1 * 1/2016 ......... H04L 63/0876

OTHER PUBLICATIONS

Zvika Brakerski; Vinod Vaikuntanathany Fully Homomorphic Encryption from (Standard) LWE (Year: 2011).*

(Continued)

*Primary Examiner* — Shin-Hon (Eric) Chen
*Assistant Examiner* — Thomas A Carnes
(74) *Attorney, Agent, or Firm* — SCHWEGMAN LUNDBERG & WOESSNER, P.A.

(57) ABSTRACT

A non-interactive protocol is provided for evaluating machine learning models such as decision trees. A client can delegate the evaluation of a machine learning model such as a decision tree to a server by sending an encrypted input and receiving only the encryption of the result. The inputs can be encoded using their binary representation. Efficient data representations are then combined with different algorithmic optimizations to keep the computational overhead and the communication cost low. Related apparatus, systems, techniques and articles are also described.

17 Claims, 3 Drawing Sheets

(56) References Cited

U.S. PATENT DOCUMENTS

| | | | | |
|---|---|---|---|---|
| 2009/0006855 | A1* | 1/2009 | Tuyls | H04L 9/3218 |
| | | | | 713/182 |
| 2009/0268908 | A1* | 10/2009 | Bikel | H04L 9/30 |
| | | | | 380/255 |
| 2013/0289756 | A1* | 10/2013 | Resch | G06F 17/00 |
| | | | | 700/94 |
| 2014/0245411 | A1* | 8/2014 | Meng | H04L 63/08 |
| | | | | 726/7 |
| 2016/0078364 | A1* | 3/2016 | Chiu | G06F 16/3338 |
| | | | | 706/11 |
| 2018/0165460 | A1* | 6/2018 | Tueno | H04L 9/06 |
| 2018/0337899 | A1* | 11/2018 | Becker | H04L 9/14 |
| 2019/0036678 | A1* | 1/2019 | Ahmed | H04L 9/302 |
| 2019/0296910 | A1* | 9/2019 | Cheung | G06N 3/10 |
| 2019/0386814 | A1* | 12/2019 | Ahmed | H04L 9/008 |
| 2020/0019867 | A1* | 1/2020 | Nandakumar | G06F 21/602 |
| 2020/0234158 | A1* | 7/2020 | Pai | G06N 5/04 |
| 2020/0252198 | A1* | 8/2020 | Nandakumar | G06N 3/063 |
| 2020/0366459 | A1* | 11/2020 | Nandakumar | G06N 20/00 |
| 2020/0382273 | A1* | 12/2020 | Vald | H04L 63/166 |
| 2020/0403781 | A1* | 12/2020 | Gentry | H04L 9/3093 |
| 2021/0084375 | A1* | 3/2021 | Park | G06K 9/6219 |
| 2021/0209247 | A1* | 7/2021 | Mohassel | A63B 21/023 |
| 2022/0052834 | A1* | 2/2022 | Vaikuntanathan | H04L 9/008 |

OTHER PUBLICATIONS

Adriana L'opez-Alt Cryptographic Algorithms for the Secure Delegation of Multiparty Computation (Year: 2014).*

Craig Gentry A Fully Homomorphic Encryption Scheme (Year: 2009).*

* cited by examiner

NON-INTERACTIVE PRIVATE DECISION TREE EVALUATION

TECHNICAL FIELD

The subject matter described herein relates to techniques for evaluating machine learning models such as decision trees in a manner in which the privacy of data inputted into a model is maintained and, additionally, privacy of the model is maintained relative to the source of the input data.

BACKGROUND

Machine learning (ML) classifiers are valuable tools in many areas such as healthcare, finance, spam filtering, intrusion detection, remote diagnosis, etc. To perform their task, these classifiers often require access to personal sensitive data such as medical or financial records. Therefore, there is a need for technologies that preserve the privacy of the data, while benefiting from the advantages of ML. On the one hand, the ML model itself may contain sensitive data. For example, a bank that uses a decision tree for credit assessment of its customers may not want to reveal any information about the model. On the other hand, the model may have been built on sensitive data. It is known that white-box and sometimes even black-box access to a ML model allows so-called model inversion attacks, which can compromise the privacy of the training data.

SUMMARY

In a first aspect, a server receives an encrypted input that encapsulates a data set. Thereafter, the server generates a classification using a decision tree using the data set without decryption. The generated classification is then provided by the server to the client to enable the client to decrypt the classification.

The decision tree can be a machine learning model that maps an n-dimensional attribute vector to a finite set of classification labels. The decision tree can include a plurality of internal nodes that each comprise a test condition, and a plurality of leaf nodes that each comprise a classification label.

A decision bit can be computed for each internal node and such computed decision bits can be aggregated for each leaf node along a corresponding path to such leaf node to determine whether one such leaf node has been reached by a classification algorithm.

The provided generated classification comprises the classification labels.

The server can receive a public key and an evaluation key from the client.

The data set can be homomorphically encrypted by the client to result in the encrypted input. The data set can be plaintext and can be encrypted bitwise.

A plurality of random strings can be generated such that the encrypted input further comprises a plurality of random strings and the data set.

The decision tree can be homomorphically evaluated. An output of such evaluation can consist only of a ciphertext of a corresponding computation result (i.e., nothing else is included).

A plurality of attribute vectors can be encoded by the client such that the server can evaluate them together in a single protocol run.

A plurality of threshold values can be evaluated by the server and evaluated together in a single operation.

The decision bits can be aggregated using a multiplication algorithm with logarithmic multiplicative depth. The decision bits can be aggregated using a pre-computation of a directed acyclic graph.

In an interrelated aspect, an encrypted input encapsulating a data set is received by a server from a client via a network. The server then homomorphically evaluates the encrypted input using a decision tree without decryption. Next, the server transmits a result of the evaluation to the client over the network to enable the client to decrypt the evaluation.

In a further interrelated aspect, a plain text data set is homomorphically encrypted bitwise. Further, a plurality of random strings is generated. An encrypted input is then formed by combining the plurality of random strings with the homomorphically encrypted data set. Thereafter, the encrypted input is then transmitted to a server executing a decision tree for evaluation. Data characterizing the evaluation is subsequently received so that it can be decrypted.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, the current subject matter allows for the evaluation of machine learning models such as decision trees without revealing sensitive information of the model or the consumer of the model.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
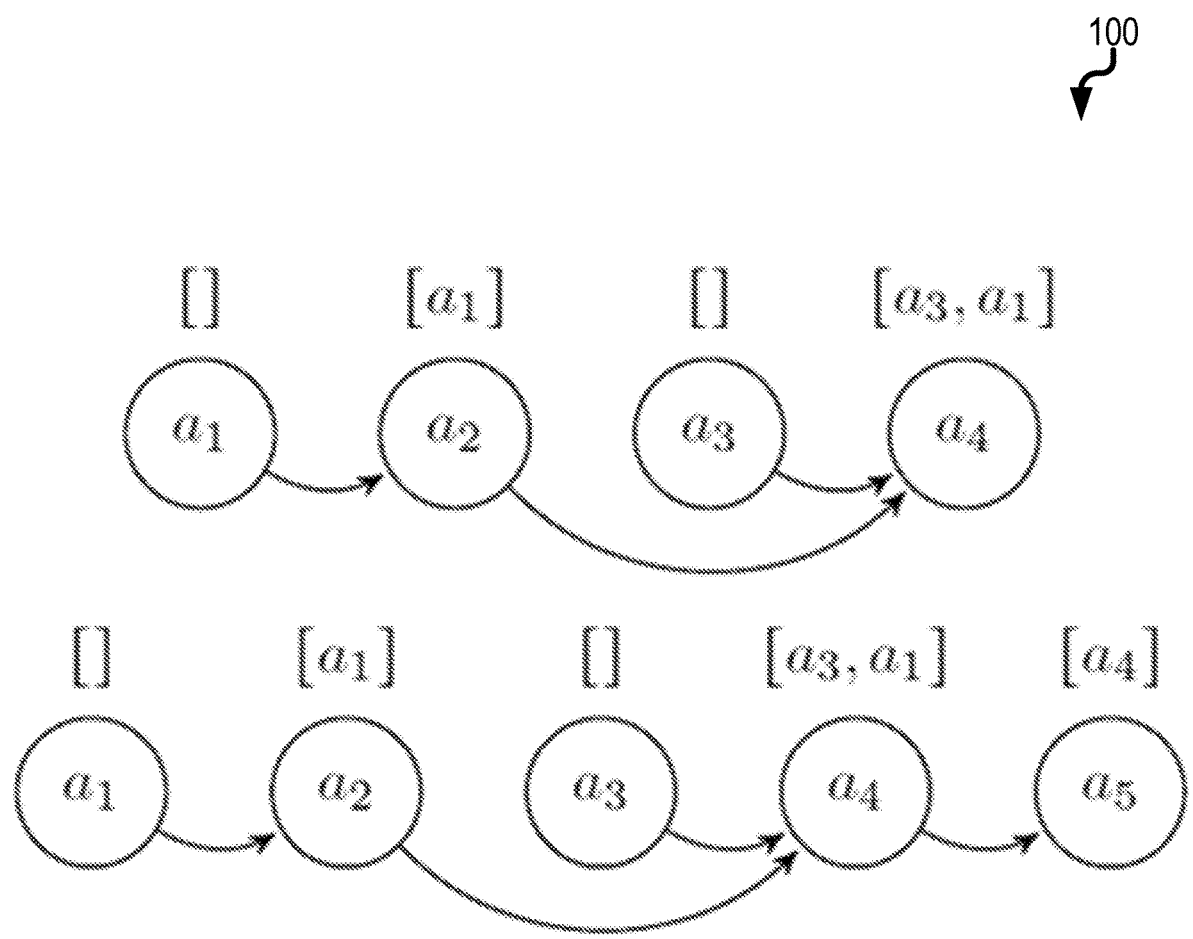
FIG. 1 is a diagram illustrating a dependency graph for 4 vertices and 5 vertices.

The current subject matter addresses the problem of privately evaluating a machine learning model such as a decision tree on private data. As will be described in more detail below, a server executes a private decision tree model and a client seeks to classify a private attribute vector using the server's private model. The goal of the computation is to obtain the classification while preserving the privacy of both—the decision tree and the client input. After the computation, the classification result is revealed only to the client, and beyond that, nothing further is revealed to neither party.

The following describes a client-server protocol that delegates the complete decision tree evaluation to the server while preserving privacy and keeping the performance acceptable. Homomorphic encryption can be used to generate ciphertexts which evaluate the tree on ciphertexts encrypted under the client's public key. As a result, no intermediate or final computational result is revealed to the evaluating server. Efficient data representations can be used with different algorithmic optimizations to keep the computational overhead and the communication cost low. Parallelization of the computation tasks can result in a reduced computation time.

A homomorphic encryption (HE) allows computations on ciphertexts by generating an encrypted result whose decryption matches the result of a function on the plaintexts. Homomorphic encryption schemes (particularly lattice-based) can be used that allow many chained additions and multiplications to be computed on plaintext homomorphically. A HE scheme consists of the following algorithms:

pk, sk, ek←KGen ($\lambda$): This probabilistic algorithm takes a security parameter $\lambda$ and outputs public, private and evaluation key pk, sk and ek.

c←Enc(pk,m): This probabilistic algorithm takes pk and a message m and outputs a ciphertext c. [[m]] is used herein as a shorthand notation for Enc(pk,m).

c←Eval(ek, $f$, $c_1$, . . . , $c_n$): This probabilistic algorithm takes ek, an n-ary function $f$ and n ciphertexts $c_1$, . . . , $c_n$ and outputs a ciphertext c.

m'←Dec(sk, c): This deterministic algorithm takes sk and a ciphertext c and outputs a message m'.

With the current subject matter, the homomorphic encryption should have the property of indistinguishability under Chosen Plaintext Attack (IND-CPA) and the following correctness conditions for all $m_1$, . . . , $m_n$:

Dec(sk, Enc(pk, $m_i$))=Dec(sk, [[$m_i$]])=$m_i$,
Dec(sk, Eval(ek, $f$, [[$m_1$]], . . . , [[$m_n$]]))=Dec(sk, [[$f(m_1, \ldots, m_n)$]]).

The encryption algorithm Enc adds "noise" to the ciphertext which increases during homomorphic evaluation. While addition of ciphertexts increases the noise linearly, the multiplication increases it exponentially. If the noise becomes too large, then correct decryption is no longer possible. To prevent this from happening, one can either keep the circuit's depth of the function $f$ low enough or use a refresh algorithm. This algorithm consists of the bootstrapping procedure, which takes a ciphertext with large noise and outputs a ciphertext (of the same message) with a smaller amount of noise. With the current subject matter, the circuit's depth can be kept low to ensure that the noise does not overwhelm the ciphertext and prevent correct decryption. This allows the usage of somewhat homomorphic encryption (SHE) and avoids bootstrapping. Therefore, in the current subject matter, the homomorphic operations will be prefixed with "SHE" for somewhat homomorphic encryption.

A Brakerski-Gentry-Vaikuntanathan (BGV) type homomorphic encryption scheme can be used. Plaintexts can be encrypted using an integer representation (an integer $x_i$ is encrypted as [[$x_i$]]) or a binary representation (each bit of the bit representation $x_i^b = x_{i\mu} \ldots x_{i1}$ is encrypted). The encryption scheme as required herein can support Smart and Vercauteren's ciphertext packing (SVCP) technique to pack many plaintexts in one ciphertext. Using SVCP, a ciphertext consists of a fixed number s of slots, each capable of holding one plaintext, i.e. [•|• . . . |•]]. The encryption of a bit b replicates b to all slots, i.e., [[b]]=[b|b| . . . |b]]. However, the bits of $x_i^b$ can be packed in one ciphertext and denoted by [[$\vec{x}_i$]]=[[$x^{i\mu}$| . . . |$x_{i1}$|0| . . . |0]]. The computation relies on some built-in routines, that allow homomorphic operations on encrypted data. The relevant routines required to the homomorphic encryption scheme are: addition (SHEADD), multiplication (SHEMULT) and comparison (SHECMP). These routines are compatible with the ciphertext packing technique (i.e., operations are replicated on all slots in a SIMD manner).

The routine SHEADD takes two or more ciphertexts and performs a component-wise addition modulo two, i.e., there is:

SHEADD([$b_{i1}$| . . . |$b_{is}$]],[[$b_{j1}$| . . . |$b_{js}$]])=[[$b_{i1} \otimes b_{j1}$| . . . |$b_{is} \otimes b_{js}$]].

Similarly, SHEMULT performs component-wise multiplication modulo two, i.e., there is:

SHEMULT([[$b_{i1}$| . . . |$b_{is}$]],[[$b_{j1}$| . . . |$b_{js}$]])=[[$b_{i1} \cdot b_{j1}$| . . . |$b_{is} \cdot b_{js}$]].

Let $x_i$, $x_j$ be two integers, $b_{ij}=[x_i>x_j]$ and $b_{ji}=[x_j>x_i]$, the routine SHECMP takes [[$x_i^b$]], [[$x_j^b$]], compares $x_i$ and $x_j$ returns [[$b_{ij}$]], [[$b_{ji}$]]:

([[$b_{ij}$]],[[$b_{ji}$]])←SHECMP([[$x_i^b$]],[[$x_j^b$]]).

Note that if the inputs to SHECMP encrypt the same value, then the routine outputs two ciphertexts of 0. This routine implements the comparison circuit described in previous work.

If ciphertext packing is enabled, then it is also assumed that the encryption supports shift operations. Given a packed ciphertext [[$b_1$| . . . |$b_s$]], the shift left operation SHESHIFTL shifts all slots to the left by a given offset, using zero-fill, i.e.:

SHESHIFTL([[$b_1$| . . . |$b_s$]],i)=[[$b_i$| . . . |$b_s$|0| . . . |0]].

The shift right operation is defined similarly for shifting to the right.

Let [a,b] denote the set of all integers from a to b. Let $c_0, \ldots c_{k-1}$ be the classification labels, $k \in \mathbb{N}_{>0}$.

With the current subject matter, a decision tree (DT) is a function $\mathcal{T}: \mathbb{Z}^n \to \{c_0, \ldots, c_{k-1}\}$ that maps an n-dimensional attribute vector ($x_0, \ldots, x_{n-1}$) to a finite set of classification labels. The tree consists of:
  internal nodes (decision nodes) containing a test condition
  leave nodes containing a classification label.

A decision tree model consists of a decision tree and the following functions:
  a function thr that assigns to each decision node a threshold value, thr: [0,m−1]→$\mathbb{Z}$,
  a function att that assigns to each decision node an attribute index, att: [0,m−1]→[0, n−1], and
  a labeling function lab that assigns to each leaf node a label, lab: [m, M−1]→$\{c_0, \ldots, c_{k-1}\}$.

The decision at each decision node is a "greater-than" comparison between the assigned threshold and attribute values, i.e., the decision at node v is [$x_{att(v)} \geq thr(v)$].

Given a decision tree, the index of a node is its order as computed by breadth-first search (BFS) traversal, starting at the root with index 0. If the tree is complete, then a node with index v has left child 2v+1 and right child 2v+2.

The node with index v as the node v. W.l.o.g, [0, k−1] will be used as classification labels (i.e., $c_j = j$ for $0 \leq j \leq k-1$) and the first (second, third, . . . ) leaf in BFS traversal will be labeled with classification label 0 (1, 2, . . . ). For a complete decision tree with depth d the leaves have indices ranging from $2^d, 2^d+1, 2^{d+1}-2$ and classification labels ranging from $0, \ldots, 2^d-1$ respectively. Since the classification labeling is now independent of the tree, $H = (T, \text{thr}, \text{att})$ can be used to denote a decision tree model consisting of a tree T and the labeling functions thr, att as defined in [0025]. It can be assumed that the tree parameters d, m, $H$ can be derived from $T$.

Given $x=(x_0, \ldots, x_{n-1})$ and $H = (T, \text{thr}, \text{att})$, then starting at the root, the Decision Tree Evaluation (DTE) evaluates at each reached node v the decision $b \leftarrow [x_{att(v)} \geq \text{thr}(v)]$ and moves either to the left (if b=0) or right (if b=1) subsequent node. The evaluation returns the label of the reached leaf as result of the computation. This result can be denoted by $T(x)$.

Let $x=(x_0, \ldots x_{n-1})$ be a client's private attribute vector and $H = (T, \text{thr}, \text{att})$ be a server's private decision tree model. A private DTE (PDTE) functionality evaluates the model H on input x, then reveals to the client the classification label $T(x)$ and nothing else, while the server learns nothing, i.e., $$\mathcal{F}_{PDTE}(H, x) \rightarrow (\epsilon, T(x)).$$

Let $x=(x_0, \ldots x_{n-1})$ be a client's private attribute vector and $H=(T, \text{thr}, \text{att})$ be a server's private decision tree model. A protocol Π correctly implements a PDTE functionality if after the computation it holds for the result c obtained by the client that $c = T(x)$.

Besides correctness, parties must learn only what they are allowed to. To formalize this, the following two definitions are needed. A function $\mu: \mathbb{N} \rightarrow \mathbb{R}$ is negligible if for every positive polynomial p(.) there exists an c such that for all $n > \epsilon$: $\mu(n) < 1/p(n)$. Two distributions $D_1$ and $D_2$ are computationally indistinguishable (denoted $D_1 \stackrel{c}{\equiv} D_2$) if no probabilistic polynomial time (PPT) algorithm can distinguish them except with negligible probability.

In SMC protocols, the view of a party consists of its input and the sequence of messages that it has received during the protocol execution. The protocol is said to be secure, if for each party, one can construct a simulator that, given only the input of that party and the output, can generate a distribution that is computationally indistinguishable to the party's view.

Let $x=(x_0, \ldots x_{n-1})$ be a client's private attribute vector and $H = (T, \text{thr}, \text{att})$ be a server's private decision tree model. A protocol $\Pi_{PDTE}$ securely implements the PDTE functionality in the semi-honest model if the following conditions hold:

there exists a PPT algorithm $\text{Sim}_S^{pdte}$ that simulates the server's view $\text{View}_S^{\Pi_{PDTE}}$ given only the private decision tree model $(T, \text{thr}, \text{att})$ such that:

$$\text{Sim}_S^{pdte}(H \ldots c) \stackrel{c}{\equiv} \text{View}_S^{\Pi_{PDTE}}(H \ldots r). \quad (1)$$

there exists a PPT algorithm $\text{Sim}_C^{pdte}$ that simulates the client's view $\text{View}_C^{\Pi_{PDTE}}$ given only the depth d of the tree, $x=(x_0, \ldots x_{n-1})$ and a classification label $T(x) \in \{0, \ldots, k-1\}$ such that:

$$\text{Sim}_C^{pdte}(<H \ldots r > T(r)) \stackrel{c}{\equiv} \text{View}_C^{\Pi_{PDTE}}(H \ldots r). \quad (2)$$

With the current subject matter, edges of the decision tree can be marked with the comparison result. So if the comparison at node v is the bit b then the right edge outgoing from v is marked with b and the left edge is marked with 1−b. This information can be stored at the child nodes of v and referred to as cmp.

For a decision tree model $H = (T, \text{thr}, \text{att})$, let Node be a data structure that for each node v defines the following:
v.threshold stores the threshold thr(v) of the node v
v.aIndex stores the associated index att(v)
v.parent stores the pointer to the parent node which is null for the root node
v.left stores the pointer to the left child node which is null for each leaf node
v.right stores the pointer to the right child node which is null for each leaf node
v.cmp is computed during the tree evaluation and stores the comparison bit $b \leftarrow [x_{att(v.parent)} \geq \text{thr}(v.parent)]$ if v is a right node. Otherwise it stores 1−b.
v.cLabel stores the classification label if v is a leaf node and the empty string otherwise.

D can be used to denote the set of all decision nodes and L the set of all leave nodes of $H$. As a result, the equivalent notation $H = (T, \text{thr}, \text{att}) = (D, L)$ can be used.

Let $x=(x_0, \ldots x_{n-1})$ be an attribute vector and $H = (D, L)$ a decision tree model. The classification function can be defied as $$f_c(x, H) = tr(x, \text{root})$$

where root is the root node and tr is the traverse function define as:

$$tr(x, v) = \begin{cases} tr(x, v.left) & \text{if } v \in \mathcal{D} \text{ and } x_{v.aIndex} < v.threshold \\ tr(x, v.right) & \text{if } v \in \mathcal{D} \text{ and } x_{v.aIndex} \geq v.threshold \\ v & \text{if } v \in \mathcal{L} \end{cases}$$

Let $x=(x_0, \ldots x_{n-1})$ be an attribute vector and $H=(T, \text{thr}, \text{att})=(D,L)$ a decision model. Then the following holds:

$$T(x) = b \cdot tr(x \cdot \text{root} \cdot \text{right}) + (1-b) \cdot tr(x \cdot \text{root} \cdot \text{left})$$

where $b = [x_{att(root)} \geq \text{thr}(\text{root})]$ is the comparison at the root node.

The proof follows by induction on the depth of the tree. In the base case, there is a tree of depth one (i.e., the root and two leaves). In the induction step, there are two trees of depth d and they can be joined by adding a new root.

With the current subject matter, an initialization step can include a one-time key generation. The client generates an appropriate triple (pk, sk, ek) of public, private and evaluation keys for a homomorphic encryption scheme. Then the client sends (pk, ek) to the server.

| Algorithm 1: Computing Decision Bits |  |
| --- | --- |
| 1: | function EvalDnode(D, [x]) |
| 2: | for each v ϵ D do |
| 3: | $[b] \leftarrow [[x_{v.aIndex} \geq v.threshold]]$ |
| 4: | [v.right.cmp] ← [b] |
| 5: | [v.left.cmp] ← [1−b] |

| Algorithm 2: Aggregating Decision Bits |  |
| --- | --- |
| 1: | function EVALPATHS(D, L) |
| 2: | let Q be a queue |
| 3: | Q.enQ(root) |
| 4: | while Q.empty( ) = false do |
| 5: | v ← Q.deQ( ) |
| 6: | [v.left.cmp] ← [v.left.cmp]·[v.cmp] |
| 7: | [v.right.cmp] ← [v.right.cmp]·[v.cmp] |
| 8: | if v.left ϵ D then |
| 9: | Q.enQ(v.left) |

| Algorithm 2: Aggregating Decision Bits |  |
|---|---|
| 10: | if v.right ∈ D then |
| 11: | Q.enQ(v.right) |

For each input classification, the client just encrypts its input and sends it to the server. To reduce the communication cost of sending client's input, a trusted randomizer can be used that does not take part in the real protocol and is not allowed to collaborate with the server. The trusted randomizer generates a list of random strings r and sends the encrypted strings [[r]] to server and the list of r's to the client. For an input x, the client then sends x+r to the server in the real protocol. This technique is similar to the commodity-based cryptography with the difference that the client can play the role of the randomizer itself and sends the list of [[r]]'s (when the network is not too busy) before the protocol's start.

The server starts by computing for each node v∈D the comparison bit $b \leftarrow [x_{att(v)} \geq thr(v)]$ and stores b at the right child node (v.right.cmp=b) and 1−b at the left child node (v.left.cmp=1−b). It is illustrated in Algorithm 1.

Then for each leaf node v, the server aggregates the comparison bits along the path from the root to v. This can be implemented by using a queue and traversing the tree in BFS order as illustrated in Algorithm 2.

| Algorithm 3: Finalizing |  |
|---|---|
| 1: | function FINALIZE(L) |
| 2: | [result] ← [0] |
| 3: | for each v ∈ L do |
| 4: | [result] ← [result] + ([v.cmp] · [v.cLabel]) |
| 5: | function [result] |

| Algorithm 4: The Basic Protocol | |
|---|---|
| Client | Server |
| Input: x | Input: M = (D, L) |
| Output: T(x) | Output: ε |
| [[x]] → | |
| | EVALDNODE(D, [x]) |
| | EVALPATHS(D, L) |
| | [T(x)] ← FINALIZE(L) |
| ← [[T(x)]] | |

After Aggregating the decision bits along the path to the leave nodes, each leaf node v stores either v.cmp=0 or v.cmp=1. Then, the server aggregates the decision bits at the leaves by computing for each leaf v the value (v.cmp·v.cLabel) and summing all the results. This is illustrated in Algorithm 3.

As illustrated in Algorithm 4, the whole computation is performed by the server. It sequentially computes the algorithms described above and sends the resulting ciphertext to the client. The client decrypts and outputs the resulting classification label.

The following describes an implementation that requires encoding the plaintexts using their bit representation. Plaintext (i.e., the data set to be analyzed by the machine learning model) can be encrypted bitwise. For each plaintext $x_i$ with bit representation $x_i^b = x_{i\mu}, \ldots x_{i1}$, $[[x_i^b]]$ can be used to denote the vector $([[x_{i\mu}]], \ldots, [[x_{i1}]])$ consisting of encryptions of the bits of $x_i$. As a result, the client needs to send np ciphertexts for the n attribute values. Unfortunately, homomorphic ciphertexts are quite large. As described above, a trusted randomizer can be used to send blinded inputs instead of ciphertexts in this phase. This, however, improves only the online communication. In some variations, SVCP SIMD technique can be used which allows packing many plaintexts into the same ciphertext so they can be manipulated together during homomorphic operations.

In the binary encoding, ciphertext packing means that each ciphertext encrypts s bits, where s is the number of slots in the ciphertext. This property can be used in three different ways. First, one could pack the bit representation of each classification label in a single ciphertext and allow the server to send back a single ciphertext to the client. Second, one could encrypt several attributes together and classify them with a single protocol evaluation. Finally, one could encrypt multiple decision node thresholds that must be compared to the same attribute in the decision tree model.

Before describing how classification label packing can be used, note that aggregating the decision bits using Algorithm 2 produces for each leaf v∈L a decision bit $[[b_v]]$ which encrypts 1 for the classification leaf and 0 otherwise. Moreover, because of SVCP, the bit $b_v$ is replicated to all slot. Now, let k be the number of classification labels (i.e., |L|=k) and its bit length is |k|. For each v∈L, let $c_v$ denote the classification label v.cLabel which is |k|-bit long and has bit representation $c_i^b = c_{i|k|} \ldots c_{i1}$ with corresponding packed encryption $[[\vec{c}_v]] = [c_{i|k|} | \ldots | c_{i1} | 0 | \ldots | 0]$. As a result, computing $[[b_v]]$, $[[\vec{c}_v]]$ for each leaf v∈L and summing over all leaves results in the correct classification label.

This describes how packing many attribute values works. Let $x^{(1)}, \ldots, x^{(s)}$ be s possible attribute vectors with $x^{(l)} = [x_1^{(l)}, \ldots, x_n^{(l)}]$ 1≤l≤s. For each $x_i^{(l)}$, let $x_i^{(l)b} = x_{i\mu}^{(l)} \ldots x_{i1}^{(l)}$ be the bit representation. Then, the client generates for each attribute $x_i$ the ciphertexts $[[cx_{i\mu}]], \ldots, [[cx_{i2}]], [[cx_{i1}]]$ as illustrated in Equation 3.

$$[cx_{i1}] = [x_{i1}^{(1)} | x_{i1}^{(2)} | \ldots | x_{i1}^{(s)}]$$
$$[cx_{i2}] = [x_{i2}^{(1)} | x_{i2}^{(2)} | \ldots | x_{i2}^{(s)}] \quad \text{Manual Packing of } x_i$$
$$\ldots$$
$$[cx_{i\mu}] = [x_{i\mu}^{(1)} | x_{i\mu}^{(2)} | \ldots | x_{i\mu}^{(s)}] \quad (3)$$

To shorten the notation, let $y_j$ denote the threshold of j-th decision node (i.e., $y_j = v_j$·threshold) and assume $v_j$·aIndex=i. The server just encrypts each threshold bitwise which automatically replicates the bit to all slots. This is illustrated in Equation 4.

$$[cy_{j1}] = [y_{j1} | y_{j1} | \ldots | y_{j1}]$$
$$[cy_{j2}] = [y_{j2} | y_{j2} | \ldots | y_{j2}] \quad \text{Automatic Packing of } y_j$$
$$\ldots$$
$$[cy_{j\mu}] = [y_{j\mu} | y_{j\mu} | \ldots | y_{j\mu}] \quad (4)$$

Note that $([[cy_{j\mu}]], \ldots, [[cy_{j1}]]) = y_j^b$ holds because of SVCP. The above described encoding allows to compare s attribute values together with one threshold. This is possible because the routine SHECMP is compatible with SVCP such that:

$$S_{HE}C_{MP}(([cx_{i\mu}] \ldots [cx_{i1}]) \cdot ([cy_{j\mu}] \ldots [cy_{j1}])) = [b_{ij}^{(1)} | b_{ij}^{(2)} | \ldots | b_{ij}^{(s)}]. \quad (5)$$

Where $b_{ij}^{(l)}=[x_i^{(l)} \geq y_j]$. This results in single ciphertext such that the l-th slot contains the comparison result between $x_i^{(l)}$ and $y_j$.

Aggregating decision bits remains unchanged as described in Algorithm 2. This results in a packed ciphertext $[[b_v]]=[[b_v^{(1)}| \ldots |b_v^{(s)}]]$ for each leaf $v \in L$, where $b_v^{(1)}=1$ if $x^{(l)}$ classifies to leaf v and $b_v^{(1)}=0$ for all other leaf $u \in L-\{v\}$.

For the classification label $c_v$ of a leaf $v \in L$, let $[[c_v^b]]=([[c_{v|k|}]], \ldots, [[c_{v1}]])$ denote the encryption of the bit representation $c_v^b = c_{v|k|} \ldots c_{v1}$. To select the correct classification label Algorithm 3 is updated as follows. $([[c_{v|k|}]] \cdot [[b_v]], \ldots, [[c_{v1}]] \cdot [[b_v]])$ can be computed for each leaf $v \in L$ and they can be summed component-wise over all leaves. This results in the encrypted bit representation of the correct classification labels.

With this case of packing threshold values, the client encrypts a single attribute in one ciphertext, while the server encrypts multiple threshold values in a single ciphertext. Hence, for an attribute value $x_i$, the client generates the ciphertexts as in Equation 6. Let $m_i$ be the number of decision nodes that compare to the attribute x (i.e., $m_i = |\{v_j \in D : v_j.\text{aIndex}=i\}|$). The server packs all corresponding threshold values in $$\lceil \frac{m_i}{s} \rceil$$

ciphertext(s) as illustrated in Equation 7.

$$[\![cx_{i1}]\!] = [\![x_{i1} | x_{i1} | \ldots | x_{i1}]\!] \quad (6)$$
$$[\![cx_{i2}]\!] = [\![x_{i2} | x_{i2} | \ldots | x_{i2}]\!] \quad \text{Automatic Packing of } x_i$$
$$\ldots$$
$$[\![cx_{i\mu}]\!] = [\![x_{i\mu} | x_{i\mu} | \ldots | x_{i\mu}]\!]$$

$$[\![cy_{j1}]\!] = [\![y_{j_1 1} | \ldots | y_{j_{m_i} 1} | \ldots]\!] \quad (7)$$
$$[\![cy_{j2}]\!] = [\![y_{j_1 2} | \ldots | y_{j_{m_i} 2} | \ldots]\!] \quad \text{Manual Packing of } y_j$$
$$\ldots$$
$$[\![cy_{j\mu}]\!] = [\![y_{j_1 \mu} | \ldots | y_{j_{m_i} \mu} | \ldots]\!]$$

The packing of threshold values allows to compare one attribute value against multiple threshold values together. Unfortunately, access to the slot is not available while performing homomorphic operation. Hence, to aggregate the decision bits, $m_i$ copies of the resulting packed decision bits can be made, and each decision bit can be shifted to the first slot. Then the aggregation of the decision bits and the finalizing algorithm work as in the previous case with the only difference that only the result in the first slot matters and the remaining can be set to 0.

As explained above, the encryption algorithm Enc adds noise to the ciphertext which increases during homomorphic evaluation. While addition of ciphertexts increases the noise slightly, the multiplication increases it explosively. The noise must be kept low enough to prevent incorrect decryption. To keep the noise low, one can either keep the circuit's, depth low enough or use the refresh algorithm.

Let f be a function and $C_f$ be a Boolean circuit that computes $f$ and consists of AND-gates or multiplication (modulo 2) gates and XOR-gates or addition (modulo 2) gates. The circuit depth of $C_f$ is the maximal length of a path from an input gate to the output gate. The multiplicative depth of $C_f$ is the path from an input gate to the output with the largest number of multiplication gates.

For example, consider the function $f([a_1, \ldots, a_n]) = \prod_{i=1}^{n} a_i$. A circuit that successively multiplies the $a_i$ has multiplicative n. However, a circuit that divides the array in two halves, multiplies the elements in each half and finally multiplies the result, has multiplicative depth $$\lceil \frac{n}{2} \rceil + 1.$$

This gives us the intuition for the following lemma.

Let $[a_1, \ldots, a_n]$ be an array of n integers and $f$ be the function defined as follows:

$$f([a_1, \ldots, a_n]) = [a'_1, \ldots, a'_{\lceil \frac{n}{2} \rceil}]$$

where $$a'_1 = \begin{cases} a_{2i-1} \cdot a_{2i} & \text{if } (n \bmod 2 = 0) \vee (i < \lceil \frac{n}{2} \rceil) \\ a_n & \text{if } (n \bmod 2 = 1) \wedge (i = \lceil \frac{n}{2} \rceil) \end{cases}$$

Moreover, let $f$ be the iterated function where $f^i$ is the i-th iterate of $f$ defined as follows:

$$f^i([a_1, \ldots, a_n]) = \begin{cases} [a_1, \ldots, a_n] & \text{if } i = 0 \\ f(f^{i-1}([a_1, \ldots, a_n])) & \text{if } i \geq 1 \end{cases}$$

The $|n|$-th iterate $f^{|n|}$ off computes $\prod_{i=1}^{n} a_i$ and has multiplicative depth $|n|-1$ if n is a power of two and $|n|$ otherwise, where $|n|=\log n$ is the bitlength of n:

$$f^{|n|}([a_1, \ldots, a_n]) = \prod_{i=1}^{n} a_i$$

For the proof, two cases are considered: n is a power of two (i.e., $n=2^l$ for some l), and n is not a power of two.

With the power of two case, the proof is inductive. Assume $n=2^l$, induction is shown on l. The base case trivially holds. For the inductive step, it is assumed that the statement holds for $n=2^l$ then it needs to be shown that the statement holds for $n'=2^{l+1}$. By dividing the array $[a_1, \ldots, a_{n'}]$ in exactly two halves, the inductive assumption holds for each half. Multiplying the results of both halves concludes the proof.

With the other case, the proof is constructive. Assume n is not a power of two and let n" be the largest power of two such that n"<n, hence $|n"|=|n|$. $[a_1, \ldots, a_n]$ can be divided in two halves $A_1=[a_1, \ldots, a_{n"}]$ and $A'=[a_{n"+1}, \ldots, a_n]$. This can be done recursively for A' to get a set of subsets of $[a_1, \ldots, a_n]$ which all have a power of two number of elements. The claim then holds for each subset and $A_1$ has the largest multiplicative depth which is $|n"|-1$. By joining the result from $A_1$ and A', the product $\prod_{i=1}^{n} a_i$ with one more multiplication is obtained resulting in a multiplicative depth of $|n"|=|n|$.

Now it is known that sequentially multiplying comparison results on the path to a leaf results in a multiplicative depth which linear in the depth of tree and increase the noise exponentially. Instead of doing the multiplication sequentially, variations can be implemented in such a way as to preserve a logarithmic multiplicative depth. This is described in Algorithm 5. Algorithm 5 consists of a main function and a sub-function. The main function EVALPATHSLOGMUL collects for each leaf v encrypted comparison results on the path from the root to v and passes it as an array to the sub-function LOGCHAINEDMUL which is a divide and conquer type. The sub-function follows the construction described in the proof above ([0070] to [0072]). It divides the array in two parts (a left and a right one) such that the left part has a power of two number of elements. Then it calls the recursion on the two part and returns the product of their results.

The two functions in Algorithm 5 correctly compute the multiplication of decision bits for each path. While highly parallelizable, it is still not optimal, as each path is considered individually. As multiple paths in a binary tree share a common prefix (from the root), one would ideally want to handle common prefixes one time and not many times for each leaf. This can be solved using memoization technique which is an optimization that stores results of expensive function calls such that they can be used later if needed. Unfortunately, naive memoization would require synchronization in a multi-threaded environment and more extra storage. A pre-computation provides multiplication with logarithmic depth along the paths, while reusing the result of common prefixes, thus, avoiding unnecessary work.

---

Algorithm 5: Paths Evaluation with log Multiplicative Depth

---

Input: leaves set L, decision nodes set D
Output: Updated v.cmp for each v ∈ L
  1:    Function EVALPATHSLOGMUL(L, D)
  2:       for each v ∈ L do
  3:          let d = number of nodes on the path (root → v)
  4:          let path be an empty array of length d
  5:          l ← d
  6:          w ← v
  7:          while w ≠ root do    ▷ construct path to root
  8:             path[l] ← [w.cpm]
  9:             l ← l − 1
10:              w ← w.parent
11:          [v.cmp] ← LOGCHAINEDMUL(1,d,path)
Input: integers from and to, array of nodes path
Output: Product of elements in path
  1:    function LOGCHAINEDMUL(from, to, path)
  2:      if from ≥ to then
  3:         return path[from]
  4:      n ← to − from + 1
  5:      mid ← $2^{|n-1|-1}$ + from − 1    ▷ |n| bitlength of n
  6:      [[left]] ← LOGCHAINEDMUL(from, mid, path)
  7:      [[right]] ← LOGCHAINEDMUL(mid + 1, to, path)
  8:      return [[left]] · [[right]]

---

In the current subject matter, the path evaluation as described in Algorithm 5 can be improved using a directed acyclic graph. A directed acyclic graph (DAG) is a graph with directed edges in which there are no cycles. A vertex v of a DAG is said to be reachable from another vertex u if there exists a non-trivial path that starts at u and ends at v. The reachability relationship is a partial order ≤ and two vertices u and v are ordered as u≤v if there exists a directed path from u to v.

DAGs as used herein can have a unique maximum element. The edges in the DAG define dependency relation between vertices in the graph.

For a dependency graph, let h be the function that takes two DAGs $G_1$, $G_2$ and returns a new DAG $G_3$ that connects the maxima of $G_1$ and $G_2$. Function $g([a_1, \ldots, a_n])$ can be defined as a function that takes an array of integers and returns:

a graph with a single vertex labeled with $a_1$ if n=1 or $h(g([a_1, \ldots, a_{n'}]), g([a_{n'+1}, \ldots, a_n]))$ if n>1 holds, where $n'=2^{|n|-1}$ and |n| denotes the bitlength of n.

The DAG G generated by $G=g([a_1, \ldots, a_n])$ is referred herein as a dependency graph. For each edge $(a_i, a_j)$ in G such that i<j, it can be said that $a_j$ depends on $a_i$ and this can be denoted by adding $a_i$ in the dependency list of $a_j$. If $L(j)=[a_{i_1}, \ldots, a_{i_{|L(j)|}}]$ is the dependency list of $a_j$ then it holds $i_1 > i_2 > \ldots > i_{|L(j)|}$.

An example of dependency graph generated by the function $g([a_1, \ldots, a_n])$ is illustrated in diagram 100 of FIG. 1 for n=4 and n=5.

Let $[a_1, \ldots, a_n]$ be an array of n integers. Then $g([a_1, \ldots, a_n])$ as defined in [0078] generates a DAG whose maximum element is marked with $a_n$.

---

Algorithm 7: Multiplication using Dependency Lists

---

1:      for j = 1 to j = n do
  2:         for l = 1 to l = |L(j)| do
  3:            $a_j \leftarrow a_j \cdot a_{i_l}$

---

Let $[a_1, \ldots, a_n]$ be an array of n integers, $G=g([a_1, \ldots, a_n])$ be a DAG as defined in [0079] and $L(j)=[a_{i_1}, \ldots, a_{i_{|L(j)|}}]$ be the dependency list of $a_j$. Then Algorithm 7 computes $\Pi_{i=1}^n a_i$ and has a multiplicative depth of log(n).

The proofs of [0082] is by induction similar to the earlier proof. Before describing the improved path evaluation algorithm, the Node data structure can be extended again by adding to it a stack denoted by dag that stores the dependency list. Moreover, the nodes of the decision tree can be grouped by level and the array denoted by level[ ] can be used such that level[0] stores the root and level[i] stores the child nodes of level[i−1] for i≥1. Next described is an improved path evaluation algorithm which consists of a pre-computation step and an online step.

---

Algorithm 8: Pre-computation of Multiplication DAG

---

Input: integers up and low
Output: Computed v.dag for each v ∈ D ∪ L
  1:    function COMPUTERMULDAG(up,low)
  2:      if up ≥ low then
  3:         return    ▷ end the recursion
  4:      n ← low − up + 1
  5:      mid ← $2^{|n-1|-1}$ − 1 + up    ▷ |n| bitlength of n
  6:      for each v ∈ level[low] do
  7:         ADDDAGEDGE(v, low, mid)
  8:      for i = mid + 1 to low − 1 do    ▷ non-deepest leaves
  9:         for each v ∈ level[i] ∩ L do
10:            ADDDAGEDGE(v, i, mid)
11:      COMPUTEMULDAG(up, mid)
12:      COMPUTEMULDAG(mid + 1, low)
Input: Node v, integers currLvl and destLvl
Output: Updated v.dag
  1:    function ADDDAGEDGE(v, currLvl, destLvl)
  2:      w ← v
  3:      while currLvl > destLvl do
  4:         w ← w.parent
  5:         currLvl ← currLvl − 1
  6:      v.dag.push(w)    ▷ dag is a stack

---

Algorithm 9: Aggregate Decision Bits by Evaluating Precomputed DAG

---

Input: set of nodes stored by level in array level
Output: Updated v.cmp for each v ∈ L
  1:    function EVALPATHMULDAG
  2:      for i = 1 to d do    ▷ from top to bottom level

| Algorithm 9: Aggregate Decision Bits by Evaluating Precomputed DAG |
| --- |
| 3:   for each v ∈ level[i] do |
| 4:      while v.dag.empty( ) = false do         ▷ dag = stack |
| 5:         w ← v.dag.pop( ) |
| 6:         [v.cmp] ← [v.cmp] · [w.cmp] |

The online step is described in Algorithm 9. It follows the idea of Algorithm 7 by multiplying decision bit level-wise depending on the dependency lists.

Figure 2:
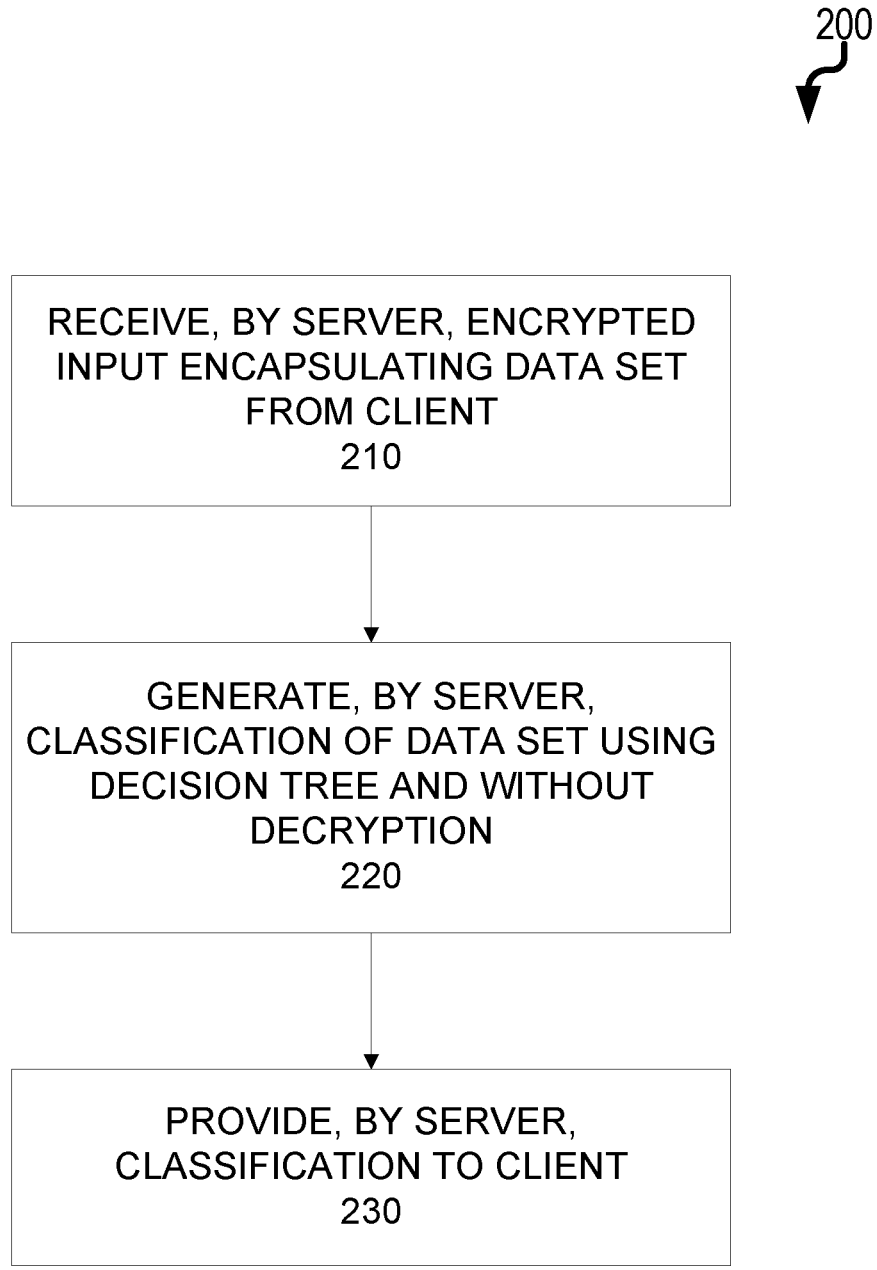
FIG. 2 is a process flow diagram illustrating a technique for machine learning model evaluation.

FIG. 2 is a process flow diagram 200 in which, at 210, a server receives an encrypted input that encapsulates a data set. Thereafter, at 220, the server generates a classification using a decision tree using the data set without decryption. The generated classification is then provided by the server to the client, at 230, to enable the client to decrypt the classification.

Figure 3:
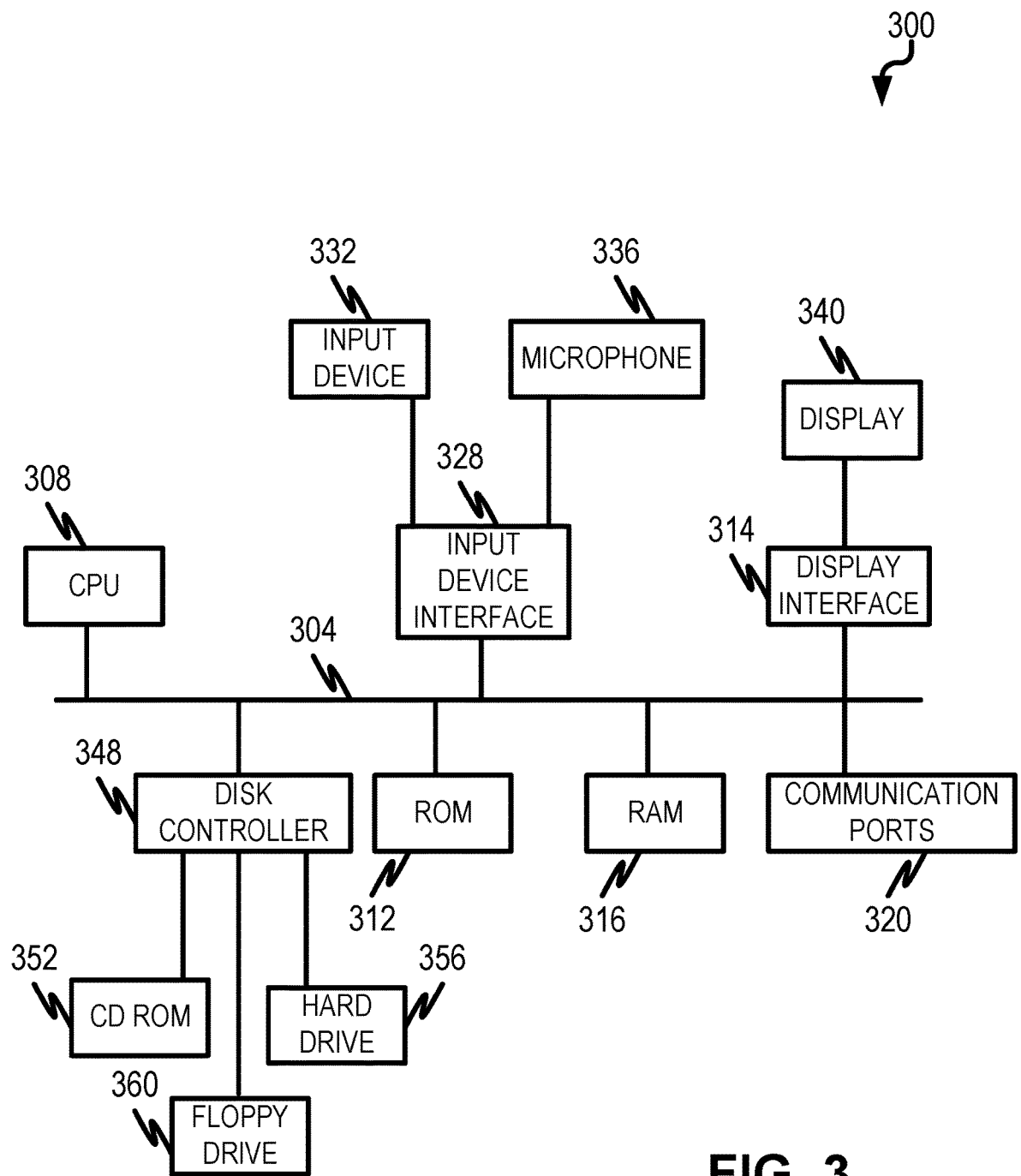
FIG. 3 is a diagram illustrating a computing device for implementing aspects of the current subject matter.

FIG. 3 is a diagram 300 illustrating a sample computing device architecture for implementing various aspects described herein. A bus 304 can serve as the information highway interconnecting the other illustrated components of the hardware. A processing system 308 labeled CPU (central processing unit) (e.g., one or more computer processors/data processors at a given computer or at multiple computers), can perform calculations and logic operations required to execute a program. A non-transitory processor-readable storage medium, such as read only memory (ROM) 312 and random access memory (RAM) 316, can be in communication with the processing system 308 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 348 can interface with one or more optional disk drives to the system bus 304. These disk drives can be external or internal floppy disk drives such as 360, external or internal CD-ROM, CD-R, CD-RW or DVD, or solid state drives such as 352, or external or internal hard drives 356. As indicated previously, these various disk drives 352, 356, 360 and disk controllers are optional devices. The system bus 304 can also include at least one communication port 320 to allow for communication with external devices either physically connected to the computing system or available externally through a wired or wireless network. In some cases, the at least one communication port 320 includes or otherwise comprises a network interface.

To provide for interaction with a user, the subject matter described herein can be implemented on a computing device having a display device 340 (e.g., a CRT (cathode ray tube) or LCD (liquid crystal display) monitor) for displaying information obtained from the bus 304 via a display interface 314 to the user and an input device 332 such as keyboard and/or a pointing device (e.g., a mouse or a trackball) and/or a touchscreen by which the user can provide input to the computer. Other kinds of input devices 332 can be used to provide for interaction with a user as well; for example, feedback provided to the user can be any form of sensory feedback (e.g., visual feedback, auditory feedback by way of a microphone 336, or tactile feedback); and input from the user can be received in any form, including acoustic, speech, or tactile input. The input device 332 and the microphone 336 can be coupled to and convey information via the bus 304 by way of an input device interface 328. Other computing devices, such as dedicated servers, can omit one or more of the display 340 and display interface 314, the input device 332, the microphone 336, and input device interface 328.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) and/or a touch screen by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computerized method, performed at a client, comprising:
   homomorphically encrypting a plaintext data set bitwise, on a bit-by-bit basis;
   receiving, from a trusted randomizer, a list comprising a plurality of non-encrypted random strings having been generated by the trusted randomizer;
   forming an input comprising the list of random strings and the homomorphically encrypted data set;
   transmitting the input to a server executing a decision tree for evaluation without decryption of the input, the trusted randomizer not allowed to collaborate with the server such that the server is blinded to the fact that some of the input was generated by the trusted randomizer;
   receiving, from the server, data characterizing the evaluation by the server; and
   decrypting the evaluation, wherein the data characterizing the evaluation by the server is calculated using a computer-implemented machine learning model comprising a decision tree and a dependency graph, wherein the decision tree is a machine learning model that maps an n-dimensional attribute vector to a finite set of classification labels, the decision tree comprising a plurality of internal nodes that each comprise a test condition, and a plurality of leaf nodes that each comprise a classification label, wherein a decision bit is computed for each internal node and, for each leaf node, the computed decision bits along a corresponding path are aggregated to determine whether one leaf node has been reached by a classification algorithm; wherein n is greater than zero.

2. The method of claim 1, wherein the evaluation comprises at least one classification of the data set.

3. The method of claim 2 wherein the server homomorphically evaluates the encrypted input without decrypting such encrypted input.

4. A computerized method for securely classifying encrypted data transmitted over a network to a remotely executed machine learning model, the method comprising:
   receiving, from a trusted randomizer, a set of encrypted random strings having been generated by the trusted randomizer;
   receiving, by a server from a client, an encrypted input encapsulating a homomorphically encrypted data set and a plurality of non-encrypted random strings, the trusted randomizer not allowed to collaborate with the server such that the server is blinded to the fact that some of the input was generated by the trusted randomizer;
   performing a pre-computation of a decision tree to create a dependency graph, the dependency graph being a directed acyclic graph defining dependencies for each of one or more nodes in the decision tree;
   generating, by the server using the homomorphically encrypted data set and without decryption of the homomorphically encrypted data set, a classification using a computer-implemented machine learning model comprising the decision tree and the dependency graph, wherein the decision tree is a machine learning model that maps an n-dimensional attribute vector to a finite set of classification labels;
   encrypting the classification; and
   providing, by the server to the client, the encrypted classification to enable the client to decrypt the classification, wherein the data characterizing the evaluation by the server is calculated using a computer-implemented machine learning model comprising a decision tree and a dependency graph, wherein the decision tree is a machine learning model that maps an n-dimensional attribute vector to a finite set of classification labels, the decision tree comprising a plurality of internal nodes that each comprise a test condition, and a plurality of leaf nodes that each comprise a classification label, wherein a decision bit is computed for each internal node and, for each leaf node, the computed decision bits along a corresponding path are aggregated to determine whether one leaf node has been reached by a classification algorithm; wherein n is greater than zero.

5. The method of claim 4, wherein the decision tree comprises a plurality of internal nodes that each comprise a test condition, and a plurality of leaf nodes that each comprise a classification label.

6. The method of claim 5, further comprising;
   computing a decision bit for each internal node; and
   aggregating, for each leaf node, the computed decision bits along a corresponding path to such leaf node to determine whether one such leaf node has been reached by a classification algorithm.

7. The method of claim 6, wherein the provided encrypted classification comprises the classification labels.

8. The method of claim 4 further comprising:
   receiving, by the server from the client, a public key and an evaluation key.

9. The method of claim 4, wherein the homomorphically encrypted data set is plaintext and is encrypted bitwise.

10. The method of claim 4 further comprising: homomorphically evaluating the decision tree.

11. The method of claim 10, wherein an output of the homomorphic evaluation of the decision tree consists of a ciphertext of a corresponding computation result.

12. The method of claim 5, further comprising:
encoding a plurality of attribute vectors by the client such that the server can evaluate them together in a single protocol run.

13. The method of claim 5, further comprising:
encoding a plurality of threshold values by the server and evaluating them together in a single operation.

14. The method of claim 6 further comprising:
aggregating the decision bits using a multiplication algorithm with logarithmic multiplicative depth.

15. The method of claim 6, further comprising:
aggregating the decision bits using a pre-computation of a directed acyclic graph.

16. The method of claim 4, wherein the providing comprises transmitting the generated classification to the client over a network;
wherein the method further comprises:
decrypting the generated classification by the client.

17. A system comprising:
at least one hardware processor; and
memory storing an application executable by the at least one hardware processor of the system to perform operations comprising:
receiving, from a trusted randomizer, a set of encrypted random strings having been generated by the trusted randomizer;
receiving, by a server from a client, an encrypted input encapsulating a homomorphically encrypted data set and a plurality of non-encrypted random strings, the trusted randomizer not allowed to collaborate with the server such that the server is blinded to the fact that some of the input was generated by the trusted randomizer;
performing a pre-computation of a decision tree to create a dependency graph, the dependency graph being a directed acyclic graph defining dependencies for each of one or more nodes in the decision tree;
generating, by the server using the homomorphically encrypted data set and without decryption of the homomorphically encrypted data set, a classification using a computer-implemented machine learning model comprising the decision tree and the dependency graph, wherein the decision tree is a machine learning model that maps an n-dimensional attribute vector to a finite set of classification labels;
encrypting the classification; and
providing, by the server to the client, the encrypted classification to enable the client to decrypt the classification, wherein the data characterizing the evaluation by the server is calculated using a computer-implemented machine learning model comprising a decision tree and a dependency graph, wherein the decision tree is a machine learning model that maps an n-dimensional attribute vector to a finite set of classification labels, the decision tree comprising a plurality of internal nodes that each comprise a test condition, and a plurality of leaf nodes that each comprise a classification label, wherein a decision bit is computed for each internal node and, for each leaf node, the computed decision bits along a corresponding path are aggregated to determine whether one leaf node has been reached by a classification algorithm; wherein n is greater than zero.

* * * * *